United States Patent
Gwo-Juh et al.

[11] Patent Number: 6,164,791
[45] Date of Patent: Dec. 26, 2000

[54] BACKLIGHT SOURCE DEVICE

[75] Inventors: Tzeng Gwo-Juh, Da Li; Hsu Chao-Ching, Tianan, both of Taiwan

[73] Assignee: Industrial Technology Research Institute, Hsinchu, Taiwan

[21] Appl. No.: 09/274,101

[22] Filed: Mar. 23, 1999

[30]   Foreign Application Priority Data

Jan. 7, 1999 [TW] Taiwan ................................. 88200164

[51] Int. Cl.[7] ........................................................ F21V 7/04
[52] U.S. Cl. .............................. 362/31; 362/330; 362/355
[58] Field of Search ................................... 362/31, 26, 27, 362/327, 339, 317, 330, 326, 340, 355, 246

[56]   References Cited

U.S. PATENT DOCUMENTS

| | | | |
|---|---|---|---|
| 5,461,547 | 10/1995 | Ciupke | 362/31 |
| 5,485,354 | 1/1996 | Ciupke | 362/31 |
| 5,575,549 | 11/1996 | Ishikawa | 362/31 |
| 5,718,497 | 2/1998 | Yokoyama | 362/31 |
| 5,779,337 | 7/1998 | Saito | 362/31 |

*Primary Examiner*—Sandra O'Shea
*Assistant Examiner*—Hargobind S. Sawhney
*Attorney, Agent, or Firm*—Bacon & Thomas, PLLC

[57]   ABSTRACT

A backlight source device including a transparent light guiding plate, a diffusing piece on the transparent light guiding plate, a reflecting piece below the transparent light guiding plate and a lateral light source. Diffusing units are installed on either a front surface or a rear surface of the transparent light guiding plate. The diffusing units have respective light guiding surfaces with different areas which are extendedly and continuously arranged. The light reflected on the diffusing units by the lateral light source becomes substantially uniform such that light and dark regions of a backlight source device can be avoided. The light guiding surfaces of the backlight source device can be formed such that different illuminations of emitted light are easily formed and illuminated.

15 Claims, 4 Drawing Sheets

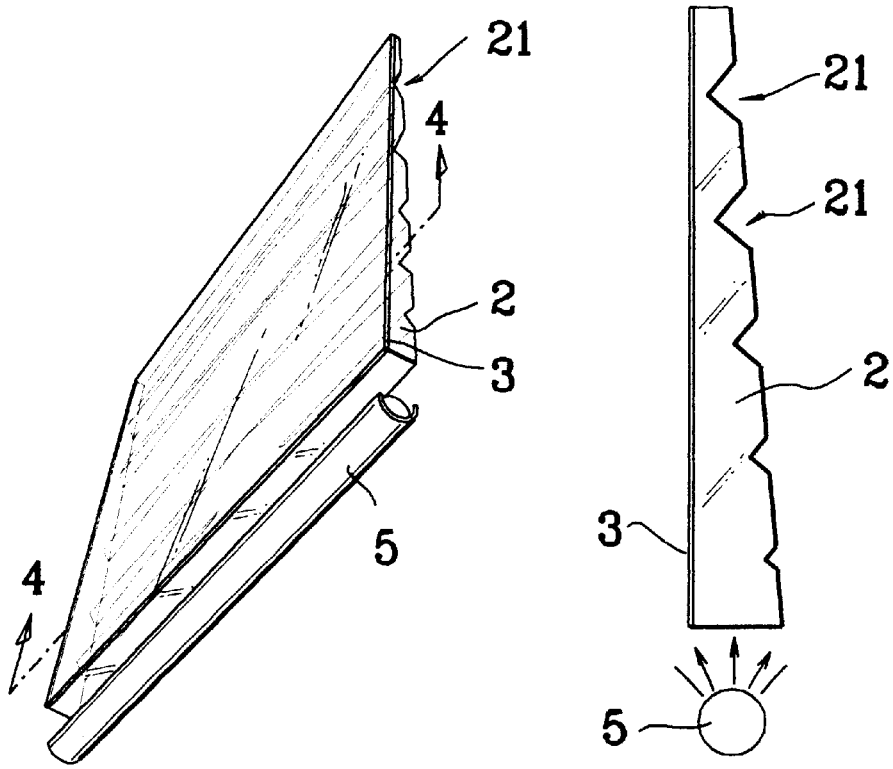
FIG.3   FIG.5
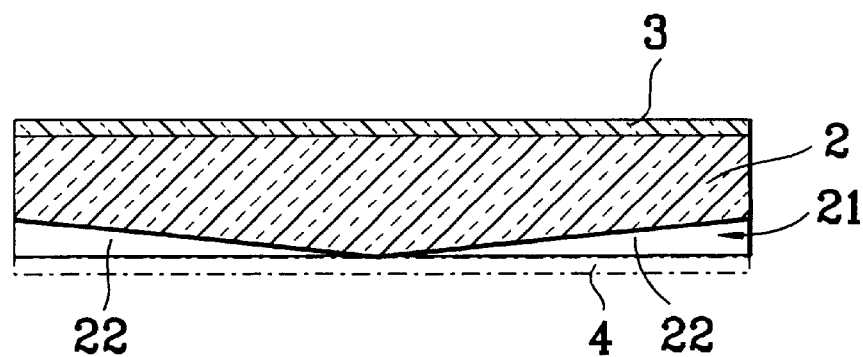
FIG.4

BACKLIGHT SOURCE DEVICE

BACKGROUND OF THE INVENTION

1. Field of the Invention

The present invention relates to a backlight source device suitable for a LCD, a display screen, a backlight plate, a broadcast plate, and other equipment having a backlight source device.

2. Description of the Prior Art

The light guiding plate 1 of a prior art backlight source device is disclosed in FIGS. 1 and 2. The pattern for guiding lateral light source 11 is a plurality of trenches arranged in parallel formed by printing, or diffusing units formed by convex strips, or point matrix, or a plurality of trenches arranged in parallel with equal space and equal depth for diffusing and reflecting a lateral light source 11. The areas of all parts of the light guiding surface 12 thereof are identical, and therefore, each part has identical illumination.

However, the light from the front surface of the light guiding plate 1 of the prior art backlight source device is not often used. Since the areas of all parts of the light guiding surface are identical, and therefore, each part has identical illumination. In general, the central portion of the lateral light source 11 has illumination stronger than that of the two sides thereof. Thus, the prior art light diffusng trenches with equal depths, height and arranged in parallel will induce a non-uniform light distribution of the prior art light guiding plate 1. Namely, the portion near the central portion of the lateral light source 11 has stronger illumination, while the two sides of the lateral light source have weaker illumination. Thus, "light regions" and "dark regions" are formed. This is not an ideal circumstance.

SUMMARY OF THE INVENTION

Accordingly, the object of the present invention is to provide a backlight source device, by which the light reflected on the diffusing units by the lateral light source becomes more uniform.

Another object of the present invention is to provide a backlight source device, by which, the light regions and dark regions of a backlight source device are avoided.

A further object of the present invention is to provide a backlight source device, by which a plurality of light guiding surfaces of the backlight source device can be formed by a simple design. Thereby, different illuminations of emitted light are easily formed and the illumination thereof is improved greatly.

In order to achieve the aforementioned objects, a backlight source device of the present invention comprises a transparent light guiding plate; a diffusing piece on the transparent light guiding plate; a reflecting piece below the transparent light guiding plate; and a lateral light source. A plurality of diffusing units are installed on either front surface or rear surface of the transparent light guiding plate, the diffusing units have respective light guiding surfaces of different areas which are extendedly and continuously arranged.

In the present invention, the transparent light guiding plate can be formed by injecting, thermal pressing, extrusion, molding, etc. The diffusing units thereon can be formed by cutting, discharging, etching, laser cutting, etc. The diffusing unit has a convex shape or a concave shape. The lateral cross section of the diffusing unit has a V shape, a U shape, or other equivalent shape, and may be distributed with equal or unequal distance. The light guiding surfaces of the diffusing units have an equal or unequal elevations. Preferably, the elevations of different light guiding surfaces are incremented with the distance increase to the lateral light source. The projecting area of the diffusing unit on the transparent light guiding plate is incremented as the distance from the lateral light source is increased. The thickness of the transparent light guiding plate may be identical or increased inversely proportional to the distance to the lateral light source for reducing the light energy loss or the weight and volume. The thickness of both sides of the transparent light guiding plate may be identical or increased with the distance to the middle thereof. As a consequence, when the transparent light guiding plate are finished in a specific depth, different projecting areas of the light guiding surfaces are extendedly arranged.

The light guiding surface is in parallel to said lateral light source or has an angle with the lateral light source. Even two sets of diffusing units are alternatively arranged with different angles and crossed over with each other to form a more uniform backlight effect. The areas of the light guiding surfaces increase with the distances to the middle of the light guiding plate. Thus, different areas of the light guiding surfaces are extendedly formed. The lateral light source may be a linear light source or a plurality of light sources arranged in one row.

The present invention will be better understood and its numerous objects and advantages will become apparent to those skilled in the art by referencing to the following drawings in which:

BRIEF DESCRIPTION OF THE DRAWINGS

FIG. 3 is a perspective view of the embodiment of backlight source device according to the present invention.

FIG. 4 is a cross sectional view along the line 4—4 of FIG. 3.

FIGS. 5 and 6 are two lateral schematic views showing two different embodiments of the backlight source devices of the present invention.

DETAILED DESCRIPTION OF THE PREFERRED EMBODIMENT

Figure 1:
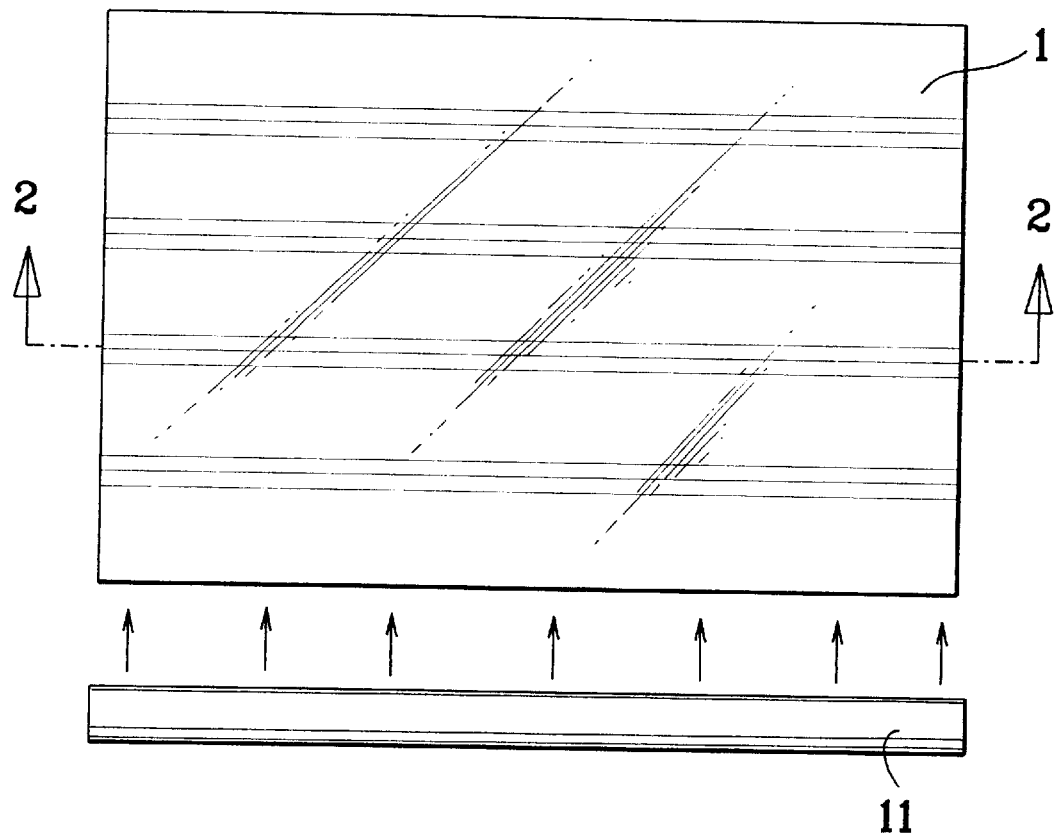
FIG. 1 is an upper view of a prior art backlight source device.
Figure 2:
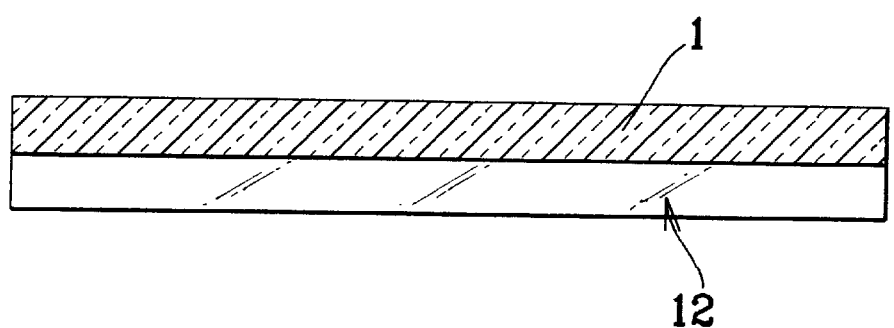
FIG. 2 is a cross sectional view along the line 2—2 of FIG. 1.

Some embodiments of the present invention are described in the following so that the present invention may be further understood.

With reference to FIGS. 3–6, the backlight source device of the present invention primarily comprises a transparent light guiding plate 2, a diffusing piece 3, a reflecting piece 4 (as the dashed line shown in FIG. 4) and a lateral light source 5. A plurality of diffusing units 21 are installed on the rear surface of the transparent light guiding plate 2 (shown in FIGS. 3, 5 and 6). The diffusing units 21 are spaced with an equal distance and have respective light guiding surfaces 22 of different areas (the detail is shown in FIG. 4). The diffusing piece 3 and the reflecting piece 4 are installed above and below the transparent light guiding plate 2 and the lateral light source is a linear light source. The area of each light guiding surface 22 is shown in FIGS. 3 or 4, namely, the middle of the transparent light guiding plate 2 serves as base and it is enlarged toward the two sides. The larger the diffusing area, the better the light diffusing effect for compensation the weak light region on the two sides. FIG. 5 shows that the diffusing unit 21 far away from the lateral light source has a large diffusing area and has a preferred diffusing effect so as to compensate the weak light region in the farther place. The diffusing units 21 on the front or rear surfaces of the transparent light guiding plate 2 have a convex (FIG. 6) or a concave (FIGS. 3 and 5) shapes. The elevation of the light guiding surface 22 is increased with the distance to the lateral light source 5.

Figure 6:
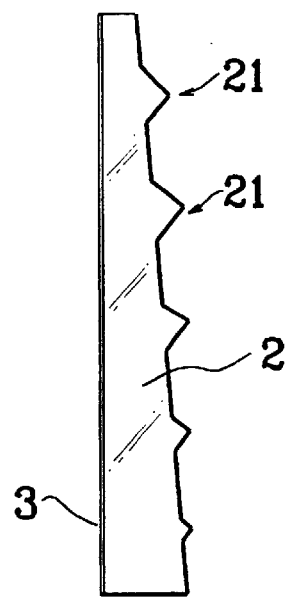
Figure 7:
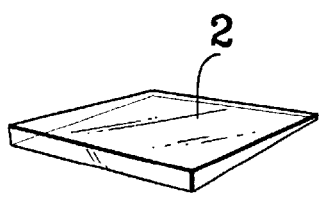
FIGS. 7–12 are perspective views of several different embodiments of the backlight source devices according to the present invention.
Figure 8:
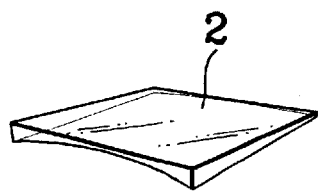
Figure 9:
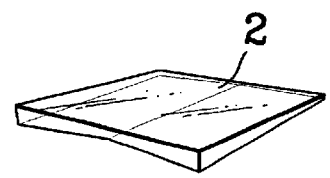
Figure 10:
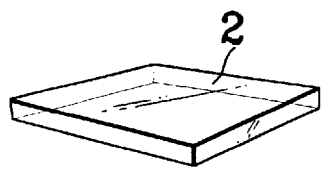
Figure 11:
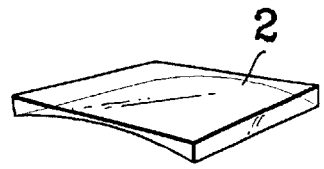
Figure 12:
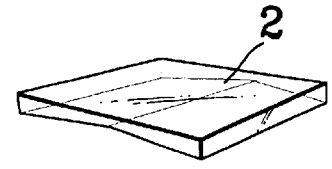

The diffusing units 21 on the FIGS. 3, 5, and 6 have a V shape lateral cross section. In FIGS. 3, 5, 6, 7, 8, 9, it is appreciated that the thickness of the transparent light guiding plate 2 is increased inversely proportional to the distance to the lateral light source 5 for reducing the light energy loss or the weight and volume thereof. FIGS. 10, 11, 12 show that the thickness from the front side to rear side of the transparent light guiding plate 2 is identical. FIGS. 8, 9, 11, 12 show the thickness of the transparent light guiding plate 2, wherein the two transverse sides have thickness wider than that in middle.

Figure 13:
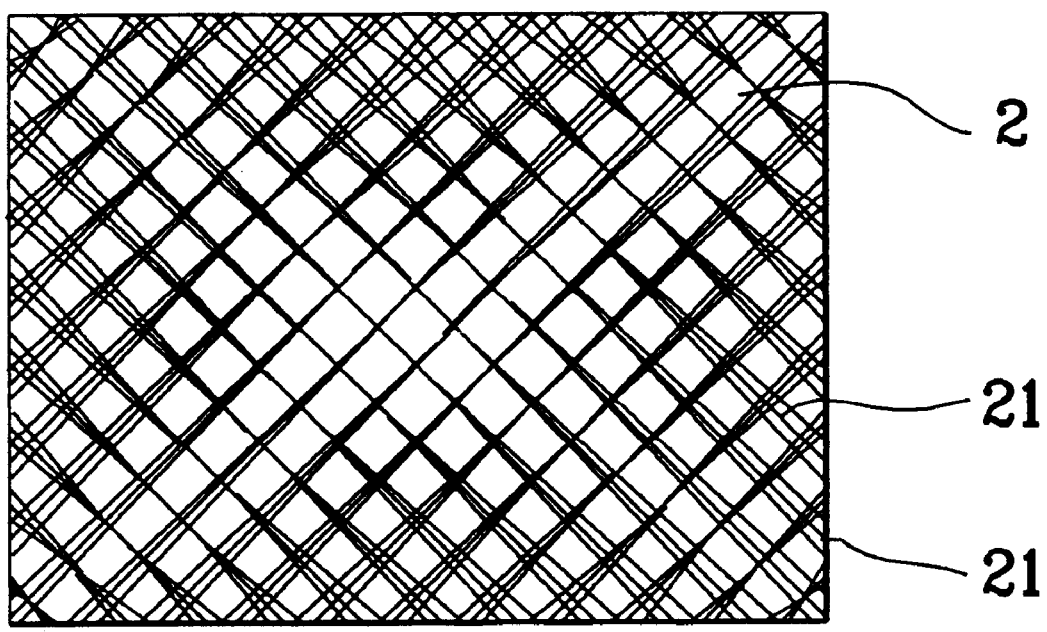
FIG. 13 is an upper view of another embodiment of the backlight source device according to the present invention.

FIG. 3 shows that the light guiding surface 22 is in parallel with the lateral light source 5. FIG. 13 shows that the light guiding surface 22 has an angle with the lateral light source. Clearly, in FIG. 13, two sets of diffusing units are alternatively arranged with different angles and crossed over with each other to form a more uniform backlight effect.

As a result, the present invention has the following advantages:

1. The illumination of reflecting light in the front surface is enhanced, the loss is reduced and the average illumination of the backlight source device is improved.
2. The dark and light regions of the backlight source device are disappeared so that the backlight area is more uniform.
3. The backlight source device of the present invention is easily fabricated.

Although the present invention has been described using specified embodiment, the examples are meant to be illustrative and not restrictive. It is clear that many other variations would be possible without departing from the basic approach, demonstrated in the present invention. Therefore, all such variations are intended to be embraced within the scope of the invention as defined in the appended claims.

What is claimed is:

1. A backlight source device, comprising:

a transparent light guiding plate having front and rear surfaces;

a plurality of diffusing units installed on either the front surface or the rear surface of said transparent light guiding plate;

said diffusing units having respective light guiding surfaces with different areas which are extendedly and continuously arranged;

a diffusing piece on said transparent light guiding plate, said diffusing units are formed as two diffusing unit sets which are alternatively arranged on said transparent light guiding plate;

a reflecting piece below said transparent light guiding plate; and a lateral light source.

2. The backlight source device as claimed in claim 1, wherein said diffusing unit has a convex shape.

3. The backlight source device as claimed in claim 1, wherein said diffusing unit has a concave shape.

4. The backlight source device as claimed in claim 1, wherein said diffusing units are arranged with different distances therebetween.

5. The backlight source device as claimed in claim 1, wherein said diffusing units each includes a lateral cross section with a V shape.

6. The backlight source device as claimed in claim 1, wherein said diffusing units each includes a lateral cross section with a U shape.

7. The backlight source device as claimed in claim 1, wherein said diffusing units each includes a projecting area and the projecting area of each of said diffusing units on said transparent light guiding plate is incremented as the distance from said lateral light source is increased.

8. The backlight source device as claimed in claim 1, wherein said light guiding-surfaces of said diffusing units have different elevations which are respectively incremented as the distance from said lateral light source is increased.

9. The backlight source device as claimed in claim 1, wherein said light guiding surface is parallel to said lateral light source.

10. The backlight source device as claimed in claim 1, wherein said light guiding surface has an angle in alignment with the lateral light source.

11. The backlight source device as claimed in claim 1, wherein said light guiding surfaces include projecting areas and the projecting areas of said light guiding surfaces increase as the distances from a middle portion of the light guiding plate is increased.

12. The backlight source device as claimed in claim 1, wherein said transparent light guiding plate includes a thickness and the thickness of said transparent light guiding plate decreases from the distance to said lateral light source.

13. The backlight source device as claimed in claim 1, wherein said transparent light guiding plate includes at least two side and the two sides of said transparent light guiding plate each has a thickness greater than that of a central portion of said transparent light guiding plate.

14. The backlight source device as claimed in claim 1, wherein the lateral light source is a linear light source.

15. The backlight source device as claimed in claim 1, wherein the lateral light source is a plurality of light sources arranged in one row.

* * * * *

(12) EX PARTE REEXAMINATION CERTIFICATE (9911th)
United States Patent
Gwo-Juh et al.

(10) Number: US 6,164,791 C1
(45) Certificate Issued: Oct. 28, 2013

(54) BACKLIGHT SOURCE DEVICE

(75) Inventors: Tzeng Gwo-Juh, Da Li (TW); Hsu Chao-Ching, Tianan (TW)

(73) Assignee: Industrial Technology Research Institute, Hsinchu (TW)

Reexamination Request:
No. 90/012,584, Sep. 14, 2012

Reexamination Certificate for:
Patent No.: 6,164,791
Issued: Dec. 26, 2000
Appl. No.: 09/274,101
Filed: Mar. 23, 1999

(30) Foreign Application Priority Data

Jan. 7, 1999 (TW) .............................. 88200164 U

(51) Int. Cl.
*F21V 7/04* (2006.01)
(52) U.S. Cl.
USPC .............................. 362/31; 362/330; 362/355
(58) Field of Classification Search
None
See application file for complete search history.

(56) References Cited

To view the complete listing of prior art documents cited during the proceeding for Reexamination Control Number 90/012,584, please refer to the USPTO's public Patent Application Information Retrieval (PAIR) system under the Display References tab.

*Primary Examiner* — Tuan H Nguyen

(57) ABSTRACT

A backlight source device including a transparent light guiding plate, a diffusing piece on the transparent light guiding plate, a reflecting piece below the transparent light guiding plate and a lateral light source. Diffusing units are installed on either a front surface or a rear surface of the transparent light guiding plate. The diffusing units have respective light guiding surfaces with different areas which are extendedly and continuously arranged. The light reflected on the diffusing units by the lateral light source becomes substantially uniform such that light and dark regions of a backlight source device can be avoided. The light guiding surfaces of the backlight source device can be formed such that different illuminations of emitted light are easily formed and illuminated.

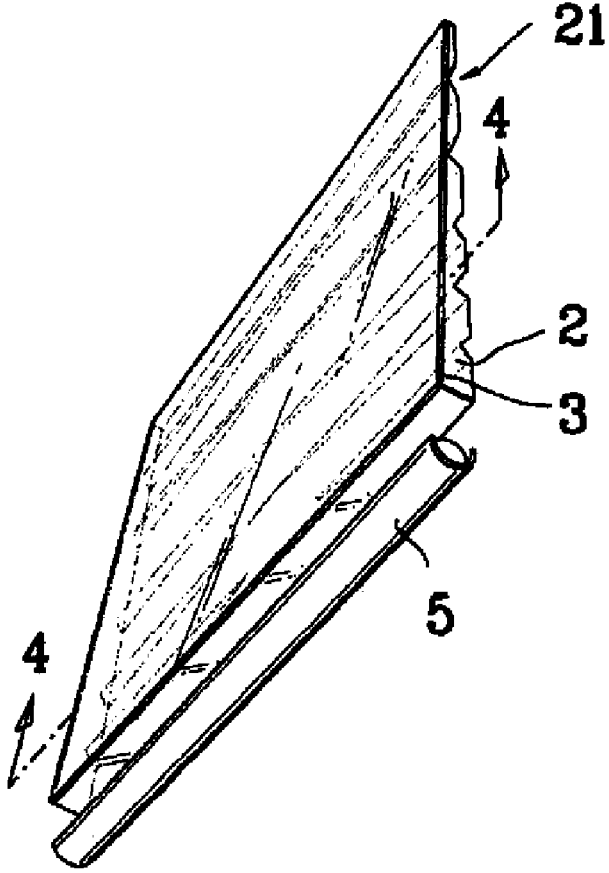

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

Claims 2-15 were not reexamined.

\* \* \* \* \*